(No Model.)

J. F. ERWIN.
TOBACCO STICK.

No. 355,759. Patented Jan. 11, 1887.

Witnesses.
A. Ruppert.
T. H. Trauernicht.

Inventor.
J. Frank Erwin,
Per
Thomas P. Simpson
Atty

UNITED STATES PATENT OFFICE.

JOHN FRANK ERWIN, OF GREENSBOROUGH, NORTH CAROLINA.

TOBACCO-STICK.

SPECIFICATION forming part of Letters Patent No. 355,759, dated January 11, 1887.

Application filed April 24, 1886. Serial No. 200,082. (No model.)

*To all whom it may concern:*

Be it known that I, JOHN FRANK ERWIN, a citizen of the United States, residing at Greensborough, in the county of Guilford and State of North Carolina, have invented certain new and useful Improvements in Tobacco-Sticks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates, generally, to sticks on which tobacco may be hung up and cured, and its special object is to so construct the stick that it may conveniently receive the leaves, the split stalks being dispensed with altogether. In this way the leaves may be graded on the sticks, thus greatly economizing subsequent labor and lessening the cost of fuel in the process of curing.

Figure 1:
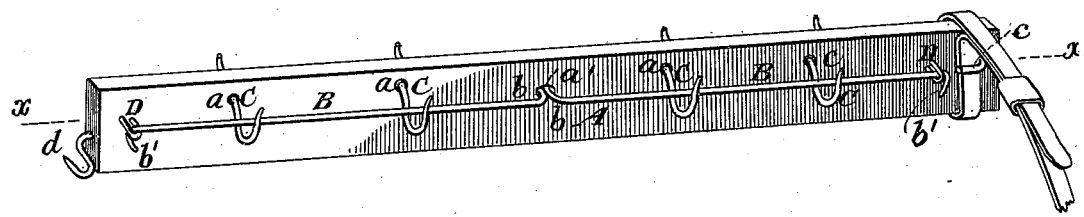
Figure 2:
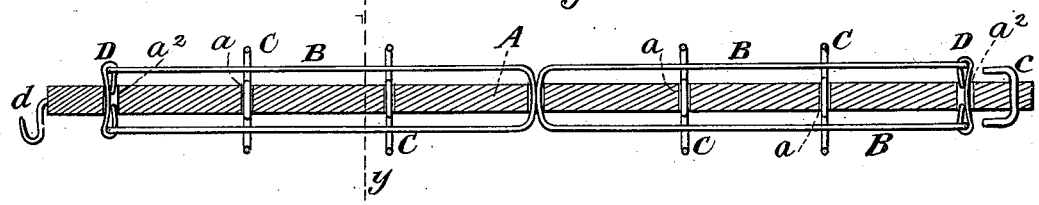
Figure 3:
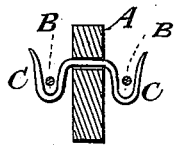

Figure 1 of the drawings is a perspective view of the top of stick, showing the local relation of the parts. Fig. 2 is a horizontal section on line $x\ x$ of Fig. 1, and Fig. 3 is a vertical cross-section on line $y\ y$ of Fig. 2.

In the drawings, A represents the main supporting-bar of the stick, B the longitudinal leaf-holders, C the cross-hooks, and D the cross-eyes. The cross-hooks pass through holes $a$ in the bar A and have a curved connecting-shank, $c$, from which the hooks descend upon opposite sides of the bar.

The longitudinal leaf-holders B are of wire and pass through a hole, $a'$, at or near the middle of bar A, and at the points $b\ b$ are bent at about a right angle, then carried along through cross-hooks, and terminally provided with the latches $b'\ b'$. The latches engage cross-eyes D, that pass through the holes $a^2\ a^2$ in the bar, near the ends of the same. The parts B C D are preferably made of wire.

The tobacco-leaves are stripped from the stalks in the field where grown and the stems slitted. They are then divided into four grades, known, respectively, as "wrapper," "fillers," "lugs," and "tips." Each of these grades is placed on a different longitudinal wire, B, the leaves being preferably arranged about an inch apart. Some large leaves are then selected and hung upon the transverse hooks, so as to form curtains between those on the wires B. The stems of the leaves being slit, the longitudinal wires are unhooked and the leaves strung upon them by passing the wire ends $b'$ through the slits until enough are on the rod. The free ends are then hooked in the eyes D.

What I claim as new, and desire to protect by Letters Patent, is—

The bar A, provided with holes $a\ a'\ a^2$, transverse hooks C, placed in holes $a$, transverse eyes D, located in holes $a^2$, and the V-shaped wires B B, having their bends in holes $a'$, extending longitudinally of the bar, and having latches engaging the eyes D, substantially as described.

In testimony whereof I affix my signature in presence of two witnesses.

JOHN FRANK ERWIN.

Witnesses:
C. F. THOMAS,
A. G. KIRKMAN.